United States Patent [19]

Schuurink et al.

[11] 4,205,102

[45] May 27, 1980

[54] METHOD FOR COATING A CURED POLYALKYLENE RUBBER SUBSTRATE

[75] Inventors: Pieter H. J. Schuurink, Noordwijk-Binnen; Arie W. Levering, Haarlem, both of Netherlands

[73] Assignee: Akzo N.V., Netherlands

[21] Appl. No.: 855,988

[22] Filed: Nov. 30, 1977

Related U.S. Application Data

[63] Continuation of Ser. No. 692,862, Jun. 4, 1976, abandoned.

[30] Foreign Application Priority Data

Jun. 9, 1975 [NL] Netherlands ................. 7506793

[51] Int. Cl.$^2$ .................. B05D 3/00; B05D 5/00; B05D 1/32
[52] U.S. Cl. .................. 427/393.5; 427/272; 428/424.8

[58] Field of Search ............... 260/77.5 AN, 77.5 TB, 260/859; 427/385 B, 272 R

[56] References Cited

U.S. PATENT DOCUMENTS

| | | | |
|---|---|---|---|
| 3,700,643 | 10/1972 | Smith | 260/77.5 AN |
| 3,931,117 | 1/1976 | Leonard | 260/77.5 AN |

*Primary Examiner*—Bernard D. Pianalto
*Attorney, Agent, or Firm*—Stevens, Davis, Miller & Mosher

[57] ABSTRACT

A polyalkylene rubber substrate is coated with a reaction product of a mixture of organic polyisocyanate and a polycaprolactone polyol having a molecular weight of 250 to 3500. The mixture from which the reaction product is prepared contains the organic polyisocyanate and polycaprolactone polyol in a ratio which provides between 0.8 and 1.35 hydroxyl groups per isocyanate group. The coating composition is dried after it has been applied to the substrate.

10 Claims, No Drawings

METHOD FOR COATING A CURED POLYALKYLENE RUBBER SUBSTRATE

This is a continuation of application Ser. No. 692,862 filed June 4, 1976 and now abandoned.

This invention relates to a method for coating a pre-treated, cured object of saturated or unsaturated polyalkylene rubber with a coating composition formed from a hydroxyl groups-containing resin and a polyisocyanate.

A method of the type indicated above is known from the Netherlands Patent Application 7 311 576, which describes coating compositions made up of saturated oligoester resins containing hydroxyl groups and having a molecular weight between 250 and 3500, of which the at least divalent alcohol component consists of 20-100 mol % of 1,4-bis(hydroxymethyl)cyclohexane and di- and/or polyvalent isocyanates. These coating compositions have the disadvantage that their flexibility is too low, particularly at low temperatures.

An object of this invention is to provide a coating for a polyalkylene rubber substrate which has an excellently high flexibility, even at very low temperatures in the order of, say, −40° C., a very high strength, a high gloss and a good to excellent hardness and scratch hardness. Another object of the invention is to provide such a coating having a very low dirt adherence. A further object of the invention is to provide a coating composition which is extremely suitable to be used as a top coat or finishing coat for rubber objects. Other objects will become apparent from the following description.

The foregoing objects and others are accomplished in accordance with this invention by providing a coating composition which comprises a binder which is made up of a polyol component containing at least 60% by weight of a polycaprolactone polyol having a molecular weight between 250 and 3500 and an organic polyisocyanate, the ratio between the number of hydroxyl groups of the polyol component and the number of isocyanate groups of the polyisocyanate being between 0.8:1 and 1.35:1.

By a saturated or unsaturated polyalkylene rubber is to be understood here a rubber which is made up of ethylene, one or more α-alkenes with 3-8 carbon atoms, for instance, propylene and/or 1-butene, and, if desired, one or more polyethylenically unsaturated compounds with non-conjugated double bonds, for instance, 1,4-hexadiene, dicyclo pentadine, 5-methylene-2-norbornene, 5-ethylidene-2-norbornene and 5-isopropylidene-2-norbornene. These rubbers are generally prepared by using metalorganic catalyst systems, known as the Ziegler-Natta-catalysts, in solution or dispersion at temperatures in the range of −30° C. to +100° C., for example, as described in the German Patent Applications 1 570 352, 1 595 447 and 1 720 450. It is preferred that use should be made of polyalkylene rubbers made up of 30 to 90% by weight of ethylene, 10 to 70% by weight of one or more α-alkenes with 3 to 8 carbon atoms, for example, propylene and/or 1-butene, and, if desired, 0.3 to 15% by weight of one or more compounds with non-conjugated, ethylenically unsaturated C-C bonds.

The polyalkylene rubber may be mixed, if desired, with one or more other rubbers, with oligomers or polymers of α-alkenes, for example, ethylene and propylene, and with usual additives such as oil, carbon black and/or other fillers, zinc oxide and stearic acid. During or after molding, which can be done in the usual way, the rubber objects are cured in a suitable manner before they are provided with a coating according to the invention. Curing is done in the usual way, use being made generally of a radical initiator and/or sulphur and/or one or more curing accelerators at temperatures between 10° C. and 200° C. Conventional curing methods are used and are known to a man skilled in the art so they are not further explained here.

The surface of the polyalkylene rubber object to be coated can be pre-treated in the usual manner, for instance by an oxidizing agent or by UV-radiation for improving the adhesion to rubber of the coating composition. As examples of suitable oxidizing agents generally used for the pre-treatment may be mentioned chromic acid, nitric acid, mixtures of nitric acid and a hydrogen halide, peroxyacetic acid, potassium permanganate, chlorine, hypochlorites and chromo sulphuric acid. The above-mentioned oxidizing agents, preferably in the form of an aqueous solution, are generally allowed to act on the polyalkylene rubber for 1 to 60 minutes at a temperature in the range of 80° to 150° C. Subsequently, the objects are washed with a suitable agent, for instance, water, and dried. In the case of the pre-treatment with UV-light, the articles are generally cleaned with soaps and/or solvents, such as aromatic or aliphatic hydrocarbons, ketones and/or esters, dried and subsequently subjected to UV-radiation. The radiation time is generally dependent on the type of light source and on the distance between the light source and the rubber object and is generally between a few seconds and about 50 minutes. To reduce the radiation time the object to be subjected to radiation may be pretreated with a sensitizer, such as benzophenone. After radiation the sensitizer may be washed off, if desired. Following the abovedescribed pre-treatment of the polyalkylene rubber object the coating composition is applied to the object by a method employed in the coating technique, for instance, by brushing, spraying, dipping, rolling, etc.

The binder of the coating composition according to the invention is made up on the one hand of a polyol component containing at least 60% by weight of a substantially divalent polycaprolactone polyol with a molecular weight between 250 and 3500, and preferably between 1000 and 3000, and, on the other hand, a polyisocyanate, by which is to be understood here a compound with two or more isocyanate groups per molecule of the polyisocyanate. As examples of suitable polyisocyanates may be mentioned the biuret of hexamethylene diisocyanate (available under the trade name "Desmodur N"), the prepolymer of trimethylol propane and toluene diisocyanate (available under the trade name "Desmodur L"), isophoron diisocyanate, toluene diisocyanate, xylenyl diisocyanate, 4,4'-diisocyanatodicyclohexylmethane, trimethyl hexamethylene diisocyanate or the prepolymers with polyols such as trimethylol propane. It is preferred that an aliphatic diisocyanate should be used. Mixtures of two or more polyisocyanates are also suitable. If desired, the polyisocyanate may be capped with suitable blocking agents, for instance, a phenol, a cresol, an oxime such as methylethyl ketoxime, or with a lactam, for instance, caprolactam. Particularly favourable results are obtained if use is made of an ester of hydroxamic acid or an acyl hydroxamate described in the Netherlands Patent Application No. 7 415 726, a relatively low decapping temperature being obtained then. The ratio of the number of hydroxyl groups of the polyol component to the number of isocyanate groups of the polyisocyanate is generally between 0.8:1 and 1.35:1 and preferably between 0.95:1 and 1.05:1.

According to the invention, it has also been found that the very good properties of the above-described coating composition can even be further improved by incorporating into the polyol component of the binder not more than 40% by weight (based on the total polyol component) of an acrylate resin containing hydroxyl groups. Such acrylate resins are mainly copolymers of one or more monovinylaromatic compounds, such as styrene and vinyl toluene, one or more alkyl (meth)acrylates with 1 to 10 carbon atoms in the alkyl group, for instance, methylmethacrylate, butylacrylate, octylmethacrylate, and if, desired, monomers such as acrylonitrile and acrylic acid, modified with one or more hydroxyalkyl(meth)acrylates, for instance, hydroxyethylacrylate and hydroxypropylmethacrylate, as a result of which the final hydroxyl content of the acrylate resin is 0.3 to 6% by weight, and preferably 1 to 5% by weight (calculated on the acrylate resin). By incorporating the acrylate resin into the coating composition also the gloss, the dirt-repelling tendency and the clarity of the coating are improved and other properties such as flexibility are not affected. It is more particularly the clarity which is of great importance in the preparation of a coating composition with metal effect, the so-called metallics, which lend the coated surface a particularly attractive appearance.

The coating composition according to the invention can be prepared in any suitable manner, for instance, by separately dissolving the polyol component, and the polyisocyanate in a solvent such as an aromatic hydrocarbon, for instance, toluene or xylene, in combination if desired with one or more esters, ketones or glycol ether esters, and subsequently intermixing the two solutions. If desired, also, for instance, one of the components of the binder can be dissolved, after which the other component may be added as such.

The coating composition may contain the usual additives, for instance, pigments, dulling agents, levelling agents such as silicone oils and conventional catalysts for accelerating the reaction between the polyol component and the polyisocyanate, for instance, dibutyltin dilaurate, zinc octoate, or tertiary amines such as triethylene diamine. The above additives may be added to the coating composition in any stage of the preparation thereof. For instance, they may be added to one or more of the separate solutions of the binder component(s), to the collective solution of the binder or in any other way, for example, by mixing with a solvent or with a binder component prior to dissolution or dispersion thereof.

After the coating composition has been applied to the rubber object, the coating is dried in the usual manner. Upon drying at a temperature between for instance 5° and 150° C., over a period of, say, 2 minutes to 24 hours the objects can be handled and stored without the risk of the coating being damaged. The time required will partly depend on the presence of a curing accelerator.

EXAMPLE 1

20 parts by weight of a polycaprolactone polyol having an average molecular weight of 2000 and an OH-functionality of 2 were dissolved in 10 parts by weight of xylene and pigmented with 8 parts by weight of titanium dioxide. Subsequently, 6 parts by weight of a 75% by weight-solution of the biuret of hexamethylene diisocyanate (available under the trade name "Desmodur N") in a 1:1 mixture of xylene and ethylene glycolmonoethylether acetate were dissolved in 9 parts by weight of diisobutyl ketone. The two resulting solutions were intermixed and subsequently diluted with 20 parts by weight of a 1:1 mixture of xylene and diisobutyl ketone. With the aid of a spray gun the coating composition thus obtained was applied to a molded article of polyalkylene rubber composed of 48% by weight of ethylene, 47% by weight of propylene, and 5% by weight of dicyclopentadiene. The molded article had been treated beforehand with benzophenone as sensitizer and subjected to UV-radiation. The coating applied was cured for 30 minutes at 100° C. The coating thickness was 30 μm. The coating was examined after it had been kept at 23° C. for 24 hours in an atmosphere having a relative humidity of 55%. The gloss was measured at an angle of 60% in accordance with the Lange method; the dirt adherence was determined after two months' outdoor exposure and the adhesion of the coating was measured in accordance with DIN 51 151. The flexibility was determined on a test panel 2 mm thick provided with a 60 μm coating. After the test panel had been kept for 24 hours at a temperature of −40° C., it was bent through 180° over a mandrel 2 mm thick at a temperature of −40° C.

The coating had a gloss of 90°/oo, its adhesion was very good (Gt=0), its dirt adherence was very small and its scratch hardness was good. Flexibility was excellent: the coating did not show any cracks.

EXAMPLE 2

10 parts by weight of a polycaprolactone polyol having an average molecular weight of 2000 and an OH-functionality of 2 were mixed with 2 parts by weight of a hydroxyl groups-containing acrylate resin having a hydroxyl content of 4.8% by weight. Subsequently, the mixture was dissolved in 10 parts by weight of xylene and pigmented with 8 parts by weight of titanium dioxide. Next, 5 parts by weight of a 75% by weight-solution of the biuret of hexamethylene diisocyanate (available under the trade name "Desmodur N") in a 1:1 mixture of xylene and ethylene glycol monoethylether acetate were dissolved in 7.5 parts by weight of diisobutyl ketone. The two resulting solutions were intermixed and subsequently diluted with 20 parts by weight of a 1:1 mixture of xylene and diisobutyl ketone.

The coating composition obtained was applied in the same way as indicated in Example 1. The properties of the resulting coating were as follows. The gloss was 94°/oo, the adhesion was very good (Gt=O), no dirt adherence was found and the scratch hardness was excellent. Flexibility was excellent: the coating did not show any cracks.

EXAMPLE 3

10 parts by weight of a polycaprolactone polyol having an average molecular weight of 1000 and an OH-functionality of 2 were mixed with 1.5 parts by weight of a hydroxyl groups-containing acrylate resin having a hydroxyl content of 4.3% by weight, after which the mixture was dissolved in 15 parts by weight of a 1:1 mixture of diisobutyl ketone and ethylene glycol acetate and subsequently pigmented with 7 parts by weight of titanium dioxide. The pigmented solution was mixed with 10 parts by weight of a 65% by weight-solution of the reaction product of 1 mole of trimethylol propane with 3 moles of isophorondiisocyanate in a 1:1 mixture of xylene and ethylene glycol acetate, and subsequently diluted with 15 parts by weight of a mixture of xylene, methylethyl ketone and ethylene glycol acetate in a weight ratio of 3:2:1. The resulting coating composition was applied to a substrate and tested in the same way as described in Example 1. The coating obtained had the following properties: the gloss was 96°/oo, its adhesion was very good (Gt=0), and no dirt adherence was found. Flexibility at −40° C. was excellent. The surface hardness was still somewhat higher than in Example 1, so that the coating was even more scratch proof.

EXAMPLE 4

For comparison the procedure in Example 3 was repeated, however in such a way that the hydroxyl groups-containing resin was used in an amount of 7.5 parts by weight. Although the resulting coating had a gloss of 96°/oo and displayed good adhesion (Gt=0), small cracks were formed upon bending at −40° C.

EXAMPLE 5

The procedure used in Example 3 was repeated in such a way that use was made of 11 parts by weight of an 80% by weight-solution in ethylene glycol acetate of the reaction product of allylmethacryloyl hydroxamate and the biuret of hexamethylene diisocyanate as capped isocyanate. The coating composition was cured for 15 minutes at 100° C. The coating thus obtained had a gloss of 96°/oo and its adhesion was very good (Gt=100). Its flexibility at −40° C. was good; the coating did not show any cracks. After 3 months the stability of the coating composition (in the non-cured state) was still excellent.

Although the invention is described in detail for the purpose of illustration, it is to be understood that such detail is solely for that purpose and that variations can be made therein by those skilled in the art without departing from the spirit and scope of the invention except as it may be limited by the claims.

We claim:

1. In a method of coating a pre-treated, cured object of saturated or unsaturated polyalkylene rubber with a liquid coating composition formed from a hydroxyl groups-containing resin and an organic polyisocyanate, the improvement wherein the coating composition comprises a binder which is made up of a polyol component containing at least 60% by weight of polycaprolactone polyol free from ester groups which have the unsaturated residue of acrylic acid having a molecular weight between 250 and 3500 and an organic polyisocyanate, the ratio between the number of hydroxyl groups of the polyol component and the number of isocyanate groups of the polyisocyanate being between 0.8:1 and 1.35:1.

2. A method according to claim 1 wherein the binder of the coating composition contains a polycaprolactone polyol having a molecular weight between 1000 and 3000.

3. A method according to claim 1 wherein the binder contains an aliphatic diisocyanate.

4. A method according to claim 1 wherein the ratio of the number of hydroxyl groups of the polyol component to the number of isocyanate groups of the polyisocyanate in the binder is between 0.95:1 and 1.05:1.

5. A method according to claim 1 wherein the polyol component of the binder contains not more than 40% by weight of an acrylate resin containing hydroxyl groups.

6. A method according to claim 5 wherein the acrylate resin has a hydroxyl content of 0.3 to 6% by weight.

7. A method according to claim 1, characterized in that the polyisocyanate is blocked with a hydroxamic ester or an acylhydroxamate.

8. A method according to claim 7, characterized in that the hydroxamic compound is allylmethacryloyl hydroxamate.

9. A method for coating a polyalkylene rubber substrate which comprises applying to the substrate a liquid composition consisting essentially of the reaction product of a mixture of organic polyisocyanate and polycaprolactone polyol free from ester groups which have the unsaturated residue of acrylic acid and having a molecular weight of 250 to 3500, the ratio of hydroxyl groups to isocyanate groups of said mixture being between 0.8 to 1 and 1.35 to 1, and drying the resulting coating at a temperature of 5° to 150° C.

10. A method for coating a polyalkylene rubber which comprises applying to the surface of said rubber a composition comprising a binder containing an organic polyisocyanate and a polyol which contains at least 60% by weight of a polycaprolactone polyol which is free from ester groups having an unsaturated residue of acrylic acid and having a molecular weight between 250 and 3500, the ratio between hydroxyl groups of the polyol and isocyanato groups of the polyisocyanate being between 0.8 to 1 and 1.35 to 1.

* * * * *